INVENTORS
ROBERT J. S. BROWN
JOHN E. COOLIDGE

Aug. 3, 1965

R. J. S. BROWN ETAL
PENETRATION CONTROL FOR NUCLEAR
MAGNETISM WELL LOGGING 3,199,022

Filed June 29, 1961

INVENTORS
ROBERT J. S. BROWN
JOHN E. COOLIDGE

BY
ATTORNEYS

United States Patent Office 3,199,022
Patented Aug. 3, 1965

3,199,022
PENETRATION CONTROL FOR NUCLEAR
MAGNETISM WELL LOGGING
Robert J. S. Brown, Fullerton, and John E. Coolidge,
Anaheim, Calif., assignors, by direct and mesne assignments, of one-half to Borg-Warner Corporation, Chicago, Ill., a corporation of Illinois, and one-half to California Research Corporation, San Francisco, Calif., a corporation of Delaware
Filed June 29, 1961, Ser. No. 120,693
5 Claims. (Cl. 324—.5)

This invention relates to nuclear magnetism well logging and more particularly to apparatus and methods for controlling the energization of a nuclear magnetism well logging tool to control the region of sensitivity for detection of well logging signals within an earth formation.

Well logging by nuclear magnetism methods involves the alignment of certain nuclear particles of formation materials with a relatively strong magnetic field. The alignment of these particles is termed polarization. Polarization may be accomplished by generating the strong magnetic field within a well bore penetrating the earth formation by passing a controlled current through an electromagnetic coil. The passage of current through the coil will establish a magnetic field having an alignment, in at least some portions of the earth formation, perpendicular to the earth's magnetic field. The polarization field established by the coil will diminish in strength with radial distance from the center of the well bore in accordance with the inverse square of the radial distance into the formation.

In free precession nuclear magnetism signal detection, the polarization field is terminated rapidly leaving the polarized atomic particles under the influence of the remaining earth's magnetic field as the precessional field. Under ideal conditions, the polarized atomic particles will instantly attempt realignment with the earth's magnetic field. It is well known that this realignment process cannot take place instantaneously and that the polarized particles precess around the applied magnetic field until they attain alignment with that field or, through other interparticle reactions, the polarized particles assume a random alignment within the formation.

To establish the precession of the nuclei, it is necessary that the polarizing field be shut off in a time short compared to the relaxation time of the polarized particles. The need for this short interruption time has been described in the patent to R. H. Varian, Re. 23,769, titled "Method and Means for Correlating Nuclear Properties of Atoms and Magnetic Fields," issued January 12, 1954. In that patent it is stated that the requirement for short time interruption will be obvious if it is considered that there will be little or no polarization left if the polarizing field is shut off so slowly that the polarization can die out as the field decreases. It is also required that the polarizing field be reduced from a value equal to the precessional field to zero in a time short compared to one cycle of the nuclear precession. This requirement is not quite so obvious and no full explanation is given in the patent. It is well known, however, from the theory of precessing gyroscopes that the axis around which precession takes place is parallel to the direction of the forces constituting the applied force couple causing the precession. If the direction of the applied force couple changes by only a small angle in each precession cycle, the axis around which precession takes place will follow quite exactly. Obviously, the direction of the force couple during the time when the polarization field is decreasing is the resultant of the residual polarizing field and precessional field. The resultant does not begin to change its direction rapidly until the dying polarizing field and precession field are of comparable magnitude. Since the nuclei precessing around the resultant field are equally distributed in all phases, their average direction of polarization is in the direction of the resultant field. If the polarization is allowed to follow the resultant field until only the precessional field is left, the polarization will be lined up with the precessional field, and therefore will not precess. To avoid this result, a large change in the direction of the resultant field must occur in a time short compared to a cycle of the precession frequency. This is equivalent to the requirement above stated that the polarizing field be reduced from a value equal to the precessional field to zero in a time short compared to a cycle of the precession frequency.

Recognizing that the reduction of the polarization field from a value equal to the earth's magnetic field to zero must be accomplished in a short time compared to a precession cycle, and that the strength of this polarization field within the earth formation will fall off in accordance with the inverse square of the radial distance from the center of the polarizing coil, it may be seen that the rate with which the polarization field is terminated may be used to control the radial distance into the formation from which precessional signals may be derived. In accordance with one of the procedures of the present invention, it is possible to control the region of sensitivity of the nuclear magnetism well logging tool in accordance with the control of the rate of termination of the current through the polarizing coil.

It is another aspect of the present invention to control the region of sensitivity of the nuclear magnetism well logging tool by controlling the homogeneity of the precessional field. Field inhomogeneities may be generated from within the well bore and may be controlled to penetrate into the earth formation to destroy the process of precession, so far as signal detection is concerned, in regions within the earth formation generally near to the well bore. Because the process of precession for the polarized particles is dependent upon a uniformity in the precessional field, it is possible to destroy the uniformity of this field, by making it inhomogeneous within a controlled region, and in that manner to eliminate signals from the controlled region.

A further aspect of the present invention combines the previous two aspects. Annular regions of sensitivity for the well logging tool may be selected by control of the rate of termination of the polarization current in combination with the generation of inhomogeneity creating fields. Current termination control will limit the far-out region of sensitivity and the inhomogeneity control will limit the near-in region so that an annular region for signal detection may be established.

The object of the present invention, in view of the foregoing comments is to provide a penetration control for nuclear magnetism well logging by control of the polarization of nuclear particles within the formation.

A further object of the present invention is to control the region of sensitivity of a nuclear well logging system by controlling the rate at which current is interrupted in the polarization coil.

A further object of the present invention is to control the region of sensitivity of a nuclear magnetism well logging system by controlling the homogeneity of the precessional field after interruption of polarization current through the polarization coil and during the process of precession.

Further objects and features of the invention will be readily apparent to those skilled in the art from the specification and appended drawings illustrating certain preferred embodiments wherein.

Figure 1:
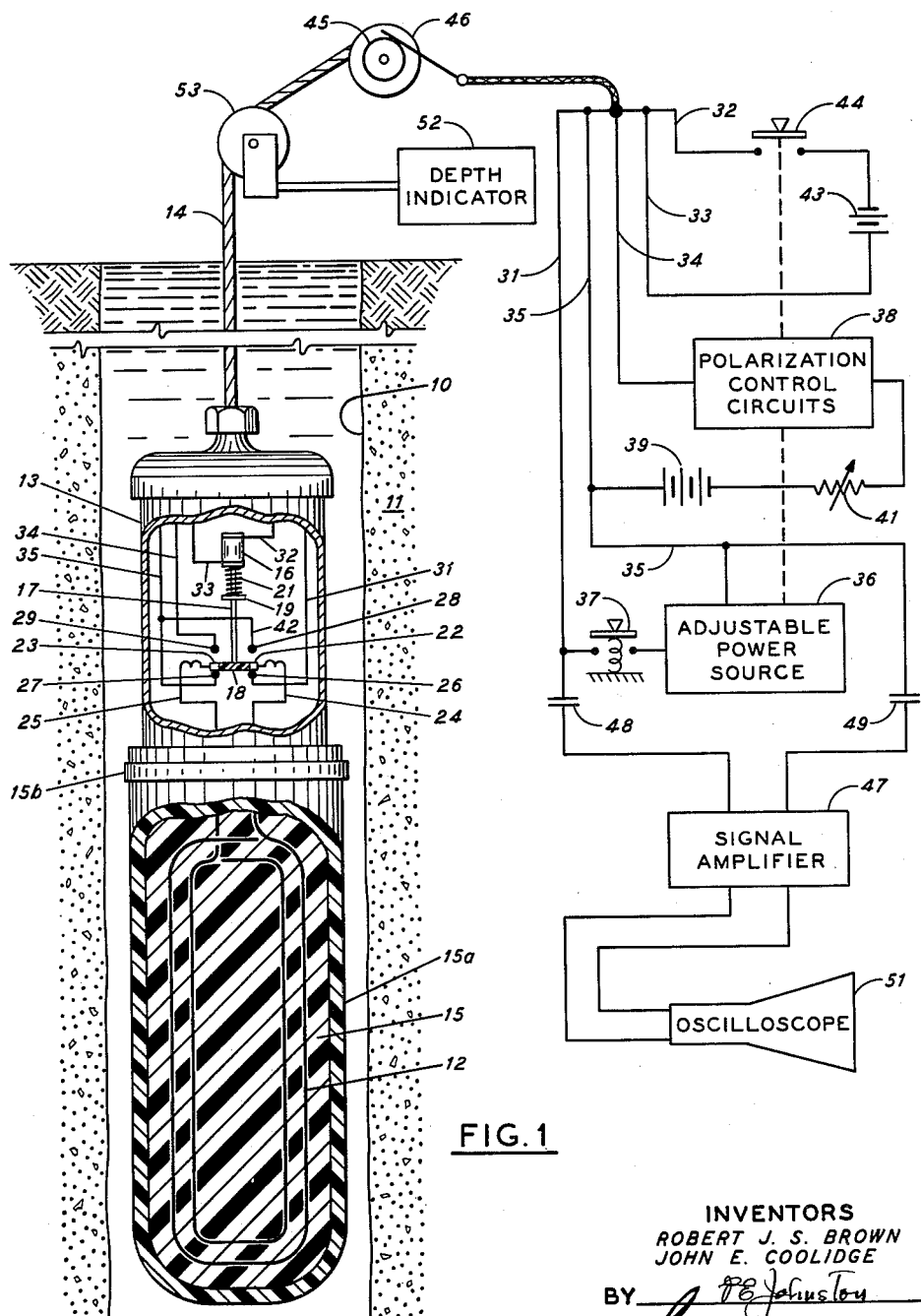
FIG. 1 is a schematic representation of a well logging tool useful in performing the methods of the present invention.
Figure 5:
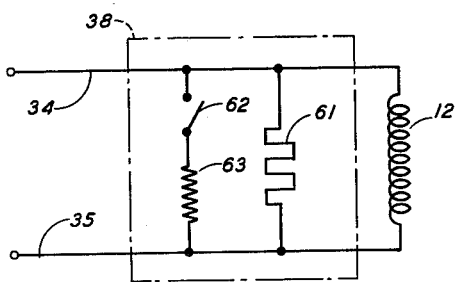
FIG. 5 is a schematic diagram illustrating a polarization current control circuit.

FIG. 1 illustrates a nuclear magnetism well logging tool useful in the performance of the method of the present invention. With the tool as illustrated in this figure, spin magnetic induction well logging measurements are made on a portion of the earth formations lying along a well bore 10 traversing an earth formation 11. The well logging tool comprises a coil 12 supported by and external to a substantially nonmagnetic logging sonde 13 suspended on a cable 14 from the earth's surface. The coil 12 may be imbedded in a liquid-impervious material 15 and may be enclosed in a protective boot 15a secured to the base of the logging sonde at 15b. The logging sonde 13 houses a switching mechanism for the energization of the coil 12 so that the single coil may be used, as will be hereinafter explained, for polarizing the earth formation 11, for generating the necessary field inhomogeneities for controlling radial regions of sensitivity, and for detecting the desired spin magnetic induction signals from the precessing particles within the formation.

The switching mechanism within the sonde 13 constitutes the solenoid 16 having an operating shaft 17 provided with an insulated contact carrier 18 and a flange 19. A spring 21 operates between the flange 19 and the body of the solenoid 16 to bias the contact carrier 18 into the nonenergized position as shown in FIG. 1. Contact carrier 18 is provided at the ends thereof with a pair of contacts 22 and 23 connected by conductors 24 and 25, respectively, to the terminals (not shown) of the coil 12. Four stationary contacts 26, 27, 28, and 29 are positioned to be engaged by contacts 22 and 23, in different pairs, for energized and de-energized positions of the solenoid 16.

Cable 14 supports the sonde 13 and encases conductors 31, 32, 33, 34 and 35 carrying the energization and control for the logging sonde from the uphole components at the earth's surface. Conductors 31 and 35 are connected in the logging sonde to contacts 26 and 27, respectively. At the earth's surface these conductors connect an adjustable power source 36 to the downhole contacts 26 and 27 through a switch 37. Conductor 34 is connected downhole to contact 29 of solenoir 16 and uphole to an interruption control circuit 38, battery 39 and adjustable resistor 41. Conductor 35 is also connected to one terminal of the battery 39 at the earth's surface and to contact 28 by conductor 42 in the logging sonde. Conductors 32 and 33 are connected to the solenoid 16 downhole and to battery 43 through switch 44. The interconnection between the uphole and downhole sections of the logging sonde through conductors 31–35 is provided by a slip-ring 45 on cable drum 46 about which cable 14 is wound in raising and lowering the sonde 13 in the well bore 10.

In addition to the control circuitry just described, the uphole components of the apparatus for performing the methods of the present invention also include an amplifier 47, an oscilloscope 51 and a depth indicator 52. The amplifier is connected to the coil 12 through blocking capacitors 48 and 49 in conductors 31 and 35, respectively. The oscilloscope 51 is driven by the amplifier 47 to display precessional signals detected by the coil 12, and the depth indicator 52 is mechanically connected to a pulley 53 driven by the cable 14 to indicate the depth of the sonde within the well bore 10.

The circuitry of FIG. 1 is employed to control the energization and operation of the logging sonde for both the polarization of atomic particles and the detection of precessional signals from polarized particles within the earth formation. For polarization, the solenoid 16 is energized through the contacts of switch 44 to raise contact carrier 18 and engage contacts 22 and 23 with contacts 28 and 29, respectively. Coil 12 is thus connected to battery 39 to provide energization current as adjusted by resistor 41. This current, and the magnetic field it produces, polarizes the atomic particles within the earth formation 11. The connection of the downhole contacts for the energization of the coil 12 also sets into operation the polarization control circuits that will provide control for the manner of interruption of current through the coil to accomplish the features of the present invention. The polarization control circuit is mechanically connected to switch 44 to in turn control the de-energization of solenoid 16.

Upon de-energization of solenoid 16, movable contacts 22 and 23 are moved to engagement with contacts 26 and 27 to connect the coil 12 to the signal amplifier 47 and to the display means 51 through capacitors 48 and 49. The engagement of contacts 22 and 23 with contacts 26 and 27 also connects the adjustable power source 36 to the coil 12 through switch 37, when closed. With switch 37 closed, current supplied by the adjustable power source 36 will flow through the coil to produce electromagnetic fields in accordance with the adjustments of the current. Variations and fluctuations in the current supplied by source 36 will establish inhomogeneity producing fields in the formation as desired.

The apparatus of FIG. 1 may thus be used to perform the methods of the present invention by providing for polarization energization of the polarizing coil 12, a control for the interruption of the polarization current, the energization of the polarization coil to generate desired field inhomogeneities, and the connection of the coil 12 to the signal processing and display portions of the well logging apparatus to permit display of detected precessional signals.

It has been determined both experimentally and theoretically that a slow cutoff of the polarizing field in the performance of the nuclear magnetism well logging operation tends to eliminate the signal from the part of the formation where the last half gauss of the polarizing field is cut off in a time greater than the reciprocal angular precession frequency. As previously stated, it is necessary to reduce the polarizing field from a value approximately equal to the earth's magnetic field to a value of zero in a period of time short compared to a cycle of the precession frequency. The earth's magnetic field is about one-half gauss thus, to provide for precession at any point within the earth formation, the polarizing field must be reduced from one-half gauss to zero at that point within the allowed time. It has been found that the reciprocal angular precession frequency, or the time in which the field must be reduced to zero for the purpose of free precession well logging, is a period of about 75 microseconds and that the last half gauss of polarizing field must be cut off to zero within this time period.

Returning now to the geometry of a well logging polarization coil, it should be recalled that the field of a dipole logging coil is generally proportional to the inverse square of the radial distance from the center of the coil. Relating this geometry to the time limitation above and to the controlled polarization current through the polarization coil, it is possible to determine the approximate radial penetration of the polarization field and the radial distance into the formation from which precessional signals may be derived. Thus, if it takes 75 microseconds to cut off the last four and one-half gauss one-half foot from the center of the coil, then it will take the same time to cut off the last one-half gauss one and one-half feet into the formation. The above relationship will indicate the approximate penetration limits regardless of the polarizing power or the sensitivity of the detection circuits.

Figure 4:
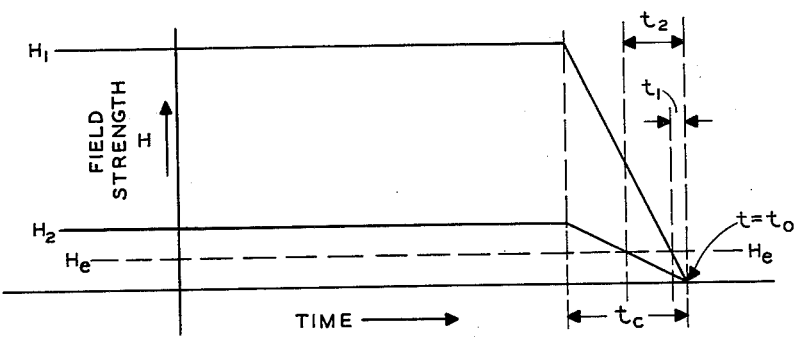
FIG. 4 is a graph of polarization field with respect to time illustrating the interruption of the polarization field prior to the detection of precession signals.

The graph of FIG. 4 will be helpful to understand the control of region of sensitivity within the formation by the control of polarization current cut-off. On that graph, $H_1$ represents the polarizing field at a first distance within the formation and $H_2$ represents the polarizing field at a second further distance within the formation. It will be appreciated that both of these fields are directly proportional to the polarizing current in the polarizing coil within the well. If the polarizing current is reduced, say, linearly with time, both of the fields, $H_1$ and $H_2$, will be reduced linearly with time and they will both diminish to zero at the same time, as shown in FIG. 4. If both $H_1$ and $H_2$ are larger than the earth's field $H_e$, and if during linear decline, they both pass through a value equal to H, it is evident from FIG. 4 that at the farther location where the polarizing field was $H_2$, the decline from $H_e$ to zero will be slower than it will be at the nearer position where the polarizing field was $H_1$. Therefore, in accordance with reasoning hereinbefore, the nuclei at the farther position will tend more to follow the resultant of the polarizing field and the earth's field and they will become aligned with the earth's field without precessing. The nuclei at the nearer location will be unable to follow the resultant field as it is rapidly removed and they will precess about the remaining earth's field to produce the desired precessional signals.

FIGS. 5—8 illustrate circuit arrangements and graphs for controlling and explaining the process of signal detection from different radial penetrations within a formation. The simplest arrangement for the control of the polarizing field can be seen in FIG. 5 where the coil 12 is shown paralleled by a voltage-sensitive, thyrite resistor 61, and by a switch 62 and series resistor 63. If the switch is maintained open, the thyrite resistor 61 will limit the current termination almost linearly to zero. The graphic illustration of FIG. 6 indicates that with the switch 62 closed, the drop-off of polarization current follows an exponential path until the relay opens at the first dotted line. At that point the polarization current drops to zero linearly in an extremely short period of time. The circuit arrangement of FIG. 7 allows the polarization current to be reduced to a first limited value and then permits rapid termination to zero.

Figure 6:
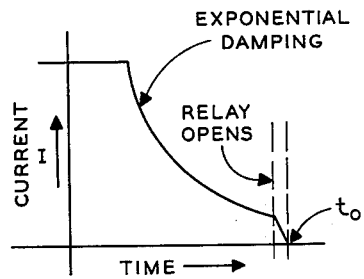
FIG. 6 is a graph of polarization current with respect to time as controlled by the circuit of FIG. 5.

A type of current cutoff specifically not suitable for eliminating signals from the more distant part of the formation is provided by exponential damping of the polarizing current, that is, by having simply an ohmic resistor in parallel with the coil to provide slow cutoff. This form of circuit provides for termination or cutoff of the polarizing current with the same function of time, but merely at different times for all parts of the formation. FIG. 4 illustrates linear cutoff of the polarizing current, whereas FIG. 6 illustrates exponential cutoff to the dotted line indication of the relay opening where linear cutoff commences. FIG. 4 also shows a variation in the cutoff time with position within the formation. If the field before cutoff is $H_1$ at a point fairly close to the borehole wall and $H_2$ at a point a little further out in the formation, then the effective cutoff time is $t_1$ for the region of the first point and $t_2$ for the region of the further out point. If the reciprocal angular frequency is of the order of $t_1$, then cutoff will be fast enough for good signals from the first region since the drop in polarizing field from a strength approximately equal to $H_e$ to zero is accomplished within the approximate 75 microseconds. On the other hand, with the linear cutoff of polarization current, the region polarized by $H_2$, will have the polarizing field reduced from a value approximately equal to $H_e$ to a value of zero in the period $t_2$. The period $t_2$ is much longer than the 75 microseconds and too slow for signal detection from the region of this further-out point.

A slightly different cutoff cycle to accomplish the same purpose as the linear cutoff of FIG. 4 is shown in FIG. 6. During the exponential damping period, the time constant is long enough so that the polarization cutoff is slow in all parts of the formation. A representative time for the exponential damping period may be of the order of a half millisecond or more. When the polarizing current has been reduced to some predetermined value, the relay closes the circuit containing the damping resistance. At that time the remaining polarization is cut off quickly to zero.

At the time that the relay closes, the polarizing field will be the resultant of the earth's field and the electromagnetic field from the polarizing coil. The polarizing field will be decayed to zero in an appropriately short period of time for any part of the formation. After the fast cutoff of the polarization field there will be a precession of the formerly polarized atomic particles in those parts of the formation where the polarizing field immediately prior to cutoff was comparable to or greater than the earth's magnetic field. Where the field was weaker than the earth's magnetic field, most of the polarization will have become aligned in the direction of the earth's magnetic field and there will be no signal from that part of the formation.

It may thus far be seen that one method of the present invention for controlling the region of sensitivity of a nuclear magnetism well logging tool is to control the period of time permitted for the polarization field to be modified from a strength approximately equal to the earth's magnetic field to a strength of zero. If the polarization field, in those parts of the formation where it is equal to or larger than the earth's magnetic field immediately prior to cutoff, is reduced to zero within the time of the reciprocal angular frequency of the precession signals to be received, then there will be precession of the polarization in all of those parts of the formation. On the other hand, if the initial polarization field is reduced toward zero in either an exponential manner or in a linear manner prior to its complete termination longer than the prescribed reciprocal angular frequency period of time, then the polarization will be permitted to follow the resultant field of the polarizing field and the earth's field until only the earth's field is left and there will be no precession of the nuclei. Signals from far out portions of the formation will thus be lost.

Figure 7:
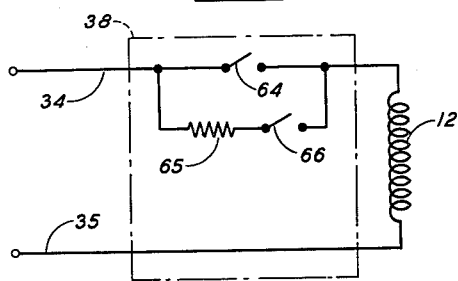
FIG. 7 is a schematic diagram for the control of polarization current in another form of operation of the present invention.
Figure 8:
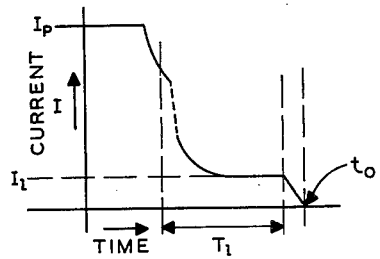
FIG. 8 is a graph of polarization current versus time for the operation of the circuit of FIG. 7.

In another manner of operating a nuclear magnetism well logging tool, the formation atomic particles are polarized in an initially strong polarizing field and then subjected to a reduced intensity magnetic field referred to as a relaxation field. During the change from the initial polarization to the relaxation polarization field, that polarization which has been further out into the formation may be destroyed if the rate at which the polarization current is reduced from strong to relaxation field strength is accomplished in a substantially long period of time. The polarization in the far-out portions of the formation may therefore follow the resultant field and be aligned with the earth's magnetic field while the nearer-in atomic particles will still be subjected to the relaxation field and will still be appropriately polarized to permit precession if this new polarization field is reduced to zero in the prescribed reciprocal angular frequency period of time. A circuit for performing the reduction to a relaxation field is illustrated in FIG. 7 with a graph showing the reduction in polarization current illustrated in FIG. 8. The decay time from $I_p$ to $I_1$ in FIG. 8 is exaggerated for the present illustration. If the exponential decay from $I_p$ to $I_1$ is slow, the polarization will be destroyed in those portions of the formation where the relaxation field is reduced to a field strength substantially less than the earth's field.

FIG. 7 illustrates a circuit for the control of a polarization coil employing a relaxation polarization cycle. A coil 12 is energized through a direct connection including switch 64 and a parallel connection including resistor 65 and switch 66. It may be seen that with switch 64 closed and switch 66 open, the initial polarization will be the direct polarization applied to the coil 12. With switch 64 open and switch 66 closed, the polarization current will be restricted by the limiting current resistor 65.

Even if the time constant determined by the resistance 65 and the coil 12 is short enough for precession to occur during the change from initial polarization to relaxation polarization, that signal will be lost if the relaxation period is long or equal to the thermal relaxation time. The predetermined value for $I_1$ will establish how far out into the formation the region of sensitivity of the well logging tool will extend. The relaxation field strength may be calculated in accordance with the reciprocal of the square of the distance from the center of the coil to determine those portions of the formation where the relaxation field will be equal to or larger than the earth's magnetic field.

In accordance with the present invention, it is also possible to control signal detection from the near-in portions surrounding the well bore. In copending application Serial No. 543,967, filed October 31, 1955, for "Nuclear Magnetism Logging Method and Apparatus," now Patent No. 2,999,203, a control of a well logging tool has been disclosed that will establish an inhomogeneous field in the vicinity of the borehole. The system disclosed therein may be used to eliminate signals from the fluids within the borehole and from portions of the formation contiguous to the borehole. The depth of penetration of this inhomogeneous field is again dependent upon the inverse square of the distance from the center of a dipole polarizing coil just as the original polarization field is so dependent.

There are several ways disclosed in the copending application that current may be controlled to produce the desired inhomogeneities in the region immediately adjacent to the borehole without producing excessive inhomogeneities further out within the formation. The simplest procedure is to establish a minimal current through the inhomogeneity producing coils all of the time. This can be done by having the coil permanently hooked to a battery through a resistor so that the minimal current will be the eventual current through the coil. As for instance, by closing switch 37 and supplying a constant current from the adjustable power source 36 of FIG. 1. However, there is an advantage to applying the inhomogeneous field for only such a time as is required to scramble the phases of the polarized particles in the immediate vicinity of the borehole. It has been found to be desirable to apply the inhomogeneous field only during the time that is normally required for the signal amplifier 47 and display means 51 to be prepared for the observation of precessional signals. In the operation of a nuclear magnetism well logging tool, there is normally a delayed period of time between the termination of the polarization field and the connection of the signal detecting coil to the signal processing circuits. In this time period circuit and tool transients are damped to permit accurate signal detection. During this period of time, or for a portion of this period of time, the polarizing coil may be energized with a field inhomogeneity producing current to destroy the signals from those portions affected by the inhomogeneous field.

The circuits for performing this method of the present invention are illustrated in FIG. 1 and constitute the adjustable power source 36 and switch 37. With these elements, here illustrated in simplified form, obvious current variations may be applied to the polarizing coil 12 after the solenoid 16 has been opened for appropriate periods of time. Most of the field inhomogeneity established by the currents may be applied within a 10 millisecond period after the beginning of precession by the energization of coil 12 from the surface circuits. By appropriate control of the current flow through the polarizing coil during this 10 millisecond period, it is possible to destroy the phase homogeneity of the precessing polarization in predetermined depths of penetration into the formation. The controlled inhomogeneous field will only slightly affect or reduce the signals from parts of the formation further out since this field will decrease in accordance with the square of the distance from the dipole coil. There will be a slight reduction in the amount of signal detected from the polarized atomic particles within the formation when a field inhomogeneity producing current is passed through the polarizing coil; however, the elimination of signals from an undesired portion of the formation and the control of the exact region of sensitivity for the detected signals provides improved interpretive information in the detected signals.

Figure 2:
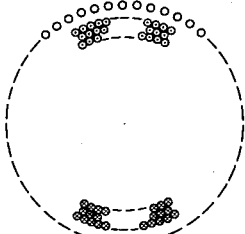
FIG. 2 and FIG 3 are horizontal cross sections through the polarization coil of the well logging tool illustrating coil configurations that may be used in the methods of the present invention.

Another embodiment of field inhomogeneity creating apparatus is illustrated by the addition of magnetized or current-carrying wires paralleling the polarization coil portion of the logging sonde. This form of apparatus is illustrated in FIG. 2 where a ring of magnetizable or energizable conductors is positioned exterior to the polarizing coil and parallel to the axis of the well bore. It may be seen that the magnetic field created by current flow through these conductors or by the magnetization of these members may be sufficient to create inhomogenities within the well bore and into the formation in accordance with the magnetic strength of their fields. On the other hand, these conductors or magnetic members will have no effect upon the precessional signals from those particles further into the formation where the precession is taking place.

Figure 3:
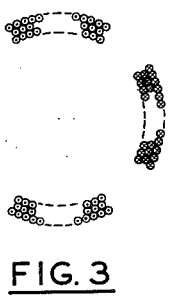

Two alternative forms of polarizing coils are shown in section in FIGS. 2 and 3, with FIG. 2 being a dipole polarization coil and FIG. 3 being a quadrupole polarization coil. The field strength of the dipole coil drops off as the square of the distance from the center, while the field from the quadrupole drops off with the cube of the distance.

In accordance with the methods of the present invention, it is possible to control the region of sensitivity of a nuclear magnetism well logging system by controlling the elimination of signals near-in and around the well bore and by controlling the rate of decay of the initial polarization field for those regions further from the well bore. Obvious combinations of these two forms of control may be employed to establish accurate regional sensitivity for the well logging tool. The operation of the polarization control circuits 38 and the adjustable power source 36 may be appropriately synchronized to provide for this penetration control.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. Apparatus for controlling the region of sensitivity for detection of spin magnetic induction well logging signals from precessing nuclei in a well bore and the surrounding earth formation, comprising:

(a) a polarization coil, (b) current supplying means to produce a current for energizing said polarizing coil to produce a polarization field in said nuclei, (c) means for changing said current from said current supplying means to reduce said polarization field to a strength less than the earth's magnetic field in certain regions of said earth formations beyond a predetermined radial distance from the center of said coil, (d) means for interrupting current from said current supplying means to terminate said polarization field in regions of said well bore and earth formation radially spaced from the center of said coil where the strength of said field is at least as great as the earth's magnetic field in a time period short with respect to the reciprocal angular frequency of said precessing nuclei, (e) and means supported on said coil for producing local field inhomogeneities in said well bore and selected regions of said earth formation contiguous to said well bore to destroy detectable spin magnetic induction signals from precessing nuclei in said well bore and selected contiguous regions.

2. The apparatus of claim 1 wherein said means supported on said coil comprises a plurality of electrical conductors extending parallel to the longitudinal axis of said well bore, and wherein said conductors are energizable to carry a current at least during the precessional period for said precessing nuclei.

3. The apparatus of claim 1 wherein said means supported on said coil comprises a plurality of magnetized members extending parallel to the longitudinal axis of said well bore.

4. A method for the selective detection of spin magnetic induction well logging signals from precessing nuclei in a selected region of interest within an earth formation, said region being an annular region around a well bore penetrating said earth formation and being measured in radial distance from the wall of said well bore toward the perimeter of said region, said nuclei being polarized by a magnetic field generated by polarizing current flow through a polarizing coil positioned within said well bore adjacent to said region, said nuclei being caused to precess in the earth's magnetic field upon controlled interruption of said polarizing current to control the rate of decay of said polarizing magnetic field, the method comprising:

controlling the rate of decay of said polarizing current through said coil to control the rate of decay of the magnetic field produced by said coil at the perimeter of said annular region to reduce said field substantially linearly with respect to time, at a rate equal to the strength of the earth's magnetic field divided by the reciprocal angular frequency of said precessing nuclei to initiate said precession of said nuclei.

5. A method for the selective detection of spin magnetic induction well logging signals from precessing nuclei in a selected region of interest within an earth formation, said region being an annular region around a well bore penetrating said earth formation and being measured in radial distance from the wall of said well bore toward the perimeter of said region, said nuclei being polarized by a magnetic field generated by polarizing current flow through a polarizing coil positioned within said well bore adjacent to said region, said nuclei being caused to precess in the earth's magnetic field upon controlled interruption of said polarizing current to control the rate of decay of said polarizing magnetic field, the method comprising:

(a) first controlling the rate of decay of said polarizing current through said coil to control the rate of decay of the magnetic field produced by said coil at the perimeter of said annular region to reduce said field to the strength of the earth's magnetic field in a time period long with respect to the reciprocal angular frequency of said precessing nuclei, (b) then controlling the further rate of decay of said polarizing current through said coil to reduce the strength of said magnetic field produced by said coil at the perimeter of said annular region from the strength of the earth's magnetic field to a strength substantially less than the earth's magnetic field in a time period substantially equal to the reciprocal angular frequency of said precessing nuclei to initiate said precession of said nuclei in said annular region in the earth's magnetic field.

References Cited by the Examiner

UNITED STATES PATENTS

| | | | |
|---|---|---|---|
| 2,999,203 | 9/61 | Brown | 324—0.5 |
| 2,999,204 | 9/61 | Jones et al. | 324—0.5 |
| 3,004,212 | 10/61 | Coolidge et al. | 324—0.5 |

FOREIGN PATENTS

| | | |
|---|---|---|
| 586,235 | 11/59 | Canada. |
| 1,236,724 | 6/60 | France. |

OTHER REFERENCES

Pawles et al.: Archives des Sciences (Colloque Ampere), vol. 11, July 1958, pages 209–214 incl.

Waters et al.: Geophysical Prospecting, vol. 4, No. 1, pages 1–9, March 1956.

Waters et al.: Journal of Scientific Instruments, vol. 35, No. 3, March 1958, pages 88–93.

Varian: German application 1,015,954, printed Sept. 19, 1957 (Kl. 21g), 5 pages spec., 3 sheets dwg.

CHESTER L. JUSTUS, *Primary Examiner.*

MAYNARD R. WILBUR, *Examiner.*